TAPE TRANSPORT APPARATUS

Filed May 31, 1967 2 Sheets-Sheet 1

INVENTORS
Don C. Barnett
BY Kingston E. Ganske
Flehr, Hohbach, Test, Albritton & Herbert
Attorneys INVENTORS
Don C. Barnett
BY Kingston E. Ganske
Flehr, Hohbach, Test, Albritton & Herbert
Attorneys United States Patent Office 3,482,800
Patented Dec. 9, 1969

3,482,800
TAPE TRANSPORT APPARATUS

Don Carlos Barnett and Kingston E. Ganske, Columbus, Ind., assignors to Newell Associates, Inc., Sunnyvale, Calif., a corporation of California Filed May 31, 1967, Ser. No. 642,588
Int. Cl. B65h 23/06
U.S. Cl. 242—192 4 Claims

ABSTRACT OF THE DISCLOSURE

A tape transport apparatus having a drive capstan for feeding tape at constant speed cooperates with brakes on the rolls of tape in a manner maintaining capstan work-load at a constant level.

CROSS REFERENCE TO RELATED APPLICATION

Reference is made to application of C. W. Newell, Ser. No. 480,324, now U.S. Patent 3,370,803, entitled Tape Transport Apparatus and Roll Therefor, assigned to the assignee herein.

BACKGROUND OF THE INVENTION AND OBJECTS

This invention relates to tape transport appartus of a type wherein a rotating drive capstan serves to feed tape from a supply roll to a take-up roll and to a method of so feeding the tape. More particularly this invention relates to such tape transport apparatus wherein the capstan drive motor experiences changes in the work load applied thereto during feeding of tape. As disclosed herein, these changes are offset by introducing compensating changes whereby the work load remains constant.

In magnetic tape recording, it is important to feed tape at uniform speed in order to avoid problems in transducing electrical signals with respect to the tape. In tape transports where the capstan serves to drive the tape, as where, for example, friction exists at the axes of rotation of the rolls and the drive forces for rotating the rolls are supplied to the rolls tangentially thereof as by engagement of the edge of the roll with a drive capstan or by pulling longitudinally on the tape using pinch rollers cooperating with a capstan, it has been observed that as the rolls change diameter, the capstan drive motor will be subjected to a varying work load. These changes in the applied work load cause capstan speed to vary as tape is fed from one roll to the other thereby introducing the above mentioned transducing problems.

Heretofore, synchronous motors or means for servo-controlling the capstan drive motor have been employed. These devices serve to adjust the drive motor's operation in response to variations experienced in the applied work load, and in this manner serve to maintain a constant tape speed.

As disclosed herein, however, means have been employed whereby it is the applied work load which is varied so that the work load experienced by the capstan remains substantially constant notwithstanding changes in roll diameter during unwinding of the roll.

It is a general object of the invention to provide an improved tape transport apparatus.

Another object of the invention is to provide a tape transport apparatus wherein changes in the work load experienced by a capstan drive motor in response to changes in roll diameter shall be compensated to present a constant work load to the capstan.

It is yet another object of the invention to provide, in a tape transport apparatus, means responsive to unwrapping of tape from a roll thereof for applying a constant work load to the drive capstan whereby capstan speed remains constant throughout a complete transfer of a roll of tape.

It is a more particular object, therefore, of the invention to offset certain changes as would be otherwise experienced in the capstan work load by introducing compensatory changes in response to wrapping and unwrapping of tape from the rolls.

In a particularly preferred form of tape transport apparatus, the supply and take-up rolls advance and retreat relative to the drive capstan and in response to such movement a compensating drag is applied to the tape which progressively diminishes in force as the supply roll approaches the capstan. Further, means responsive to reversal of the tape movement serves to release the drag whereby tape when fed in the opposite direction, will be essentially free of such drag.

It is, therefore, another object of the invention to provide the foregoing constant work load in response to advancing and retreating movement of the rolls, ad further whereby bi-directional feeding of tape can be pursued.

These and other objects of the invention will become more readily apparent from the following description of a preferred embodiment of the invention which may be summarized as follows:

SUMMARY OF THE INVENTION

As disclosed herein, the work load applied to the capstan is varied in a manner whereby the work load experienced by the capstan remains substantially constant, notwithstanding changes in roll diameter during unwinding of the roll.

The invention will be more readily understood by reference to the drawings, in which.

Figure 3:
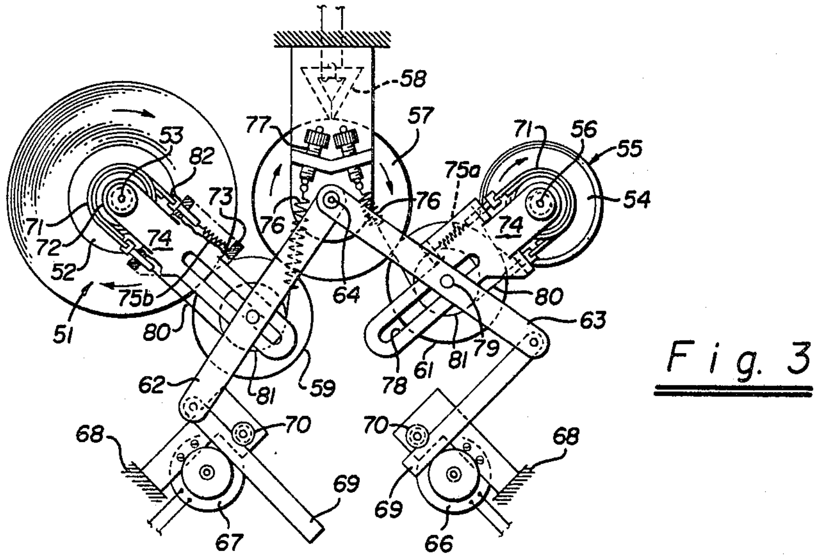
Figure 4:
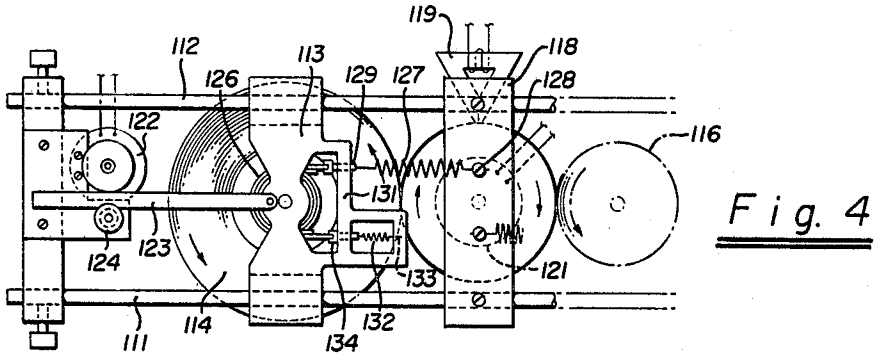

FIGURE 3 is a schematic view showing another embodiment according to the invention wherein the axes of rotation of the supply and take-up rolls and drive capstan are each disposed in fixed relation and idler rollers serve to support the tape fed between supply and take-up rolls and to compensate for changing diameters of the rolls; and FIGURE 4 is a schematic view of another embodiment according to the invention.

DESCRIPTION OF THE PREFERRED EMBODIMENT

It has been observed that if there is to be a constant tape tension at the point of tape departure from a supply roll, the degree of pull or tug on the tape or other work required to rotate such a roll varies with the radius of the roll due to the changing torque involved. To illustrate, the radius of the roll due to the changing torque involved. To illustrate, the radius of the roll serves as a "lever arm" which, when multiplied by the force of the "pull" or tug of the tape, equals the torque required to rotate the roll. It will be apparent that the changing "lever arm" of the roll, as tape is unwrapped, will cause a varying tug or pull to be required of the tape (and, hence, of the drive capstan) if tape tension is to remain constant at the point of tape departure from the supply roll.

In short (disregarding changes in the mass of the roll), it is easier for the capstan to rotate the roll when it is full than when it is empty due to the larger "lever arm" defined by the roll radius.

From the foregoing, it is apparent that a tape drive capstan, for example, of a type as shown in copending application Ser. No. 480,324, assigned to the assignee herein, which contacts and rotates a roll of tape, will be subjected to changes in the work load applied to the capstan. When the radius of the roll approaches a minimum, the change in load on the capstan increases to cause objectionable changes in capstan speed, and in tape tension.

In general, there is disclosed herein a tape transport of a type having supply and take-up rolls, a drive capstan, and means, responsive to unwrapping of the supply roll, serving to maintain a constant work load applied to the drive capstan.

The work load is maintained constant by means of brakes serving to introduce a drag or resistance to the rotation of the supply and take-up hubs. The brake drag varies in response to the advancing and retreating movements of the rolls and is oriented to offset changing tape pulling forces required to be applied by the capstan for maintaining constant speed. The brake drag offsets such changes in a manner providing a substantially constant tape tension at the point of tape departure from the supply roll.

Figures 1, 2:
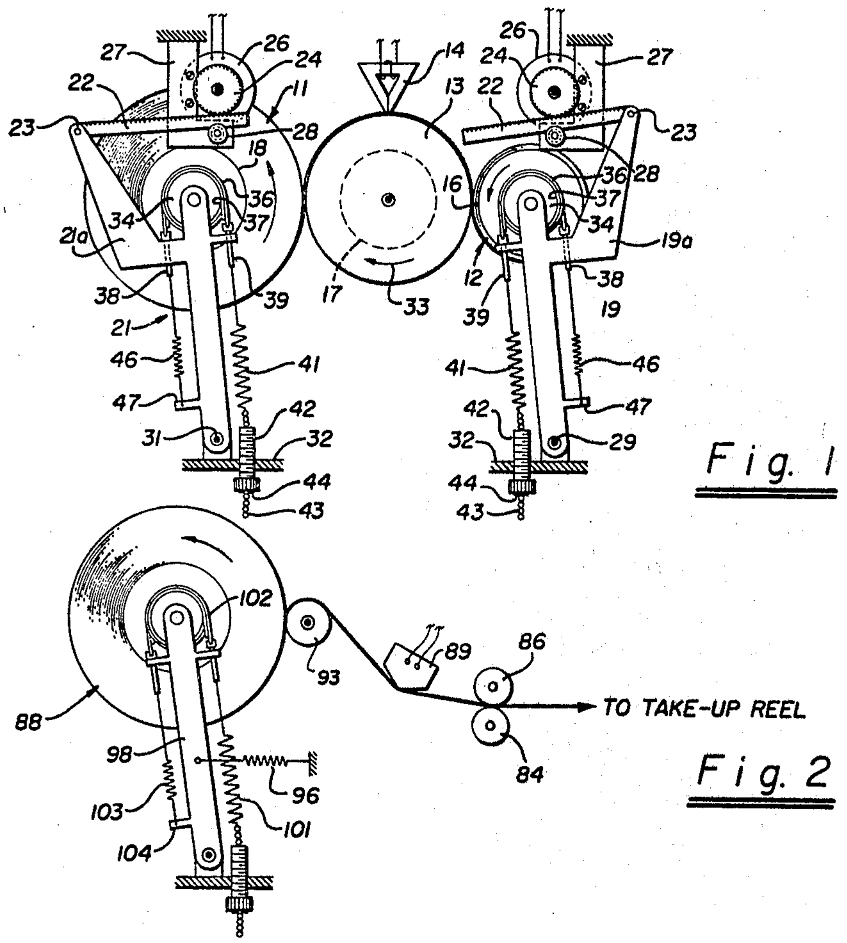
FIGURE 1 is a schematic view showing a tape transport apparatus according to the invention wherein a drive capstan is arranged to contact and drive supply and take-up rolls when feeding tape.
FIGURE 2 is a schematic view of another embodiment according to the invention.

Referring to FIGURE 1, a tape transport apparatus is shown of a type for feeding a length of pliable recording tape wrapped to form a supply roll 11 to a take-up roll 12 by means of an annular rotating body such as the drive capstan 13 arranged to drive the edges of the rolls. Thus, the tape being unwrapped from roll 11 is carried by the peripheral surface of capstan 13 past a transducer 14 and onto a hub 16. A drive motor, such as schematically shown at 17 serves to rotate capstan 13 at a predetermined speed of rotation.

Means, now to be described, responsive to unwrapping tape from roll 11 serve to maintain, at a substantially constant predetermined level, the work load as applied to capstan 13 during a complete transfer of tape from supply roll 11 to take-up roll 12.

Each hub 16, 18 is rotatably carried upon the end of a swing arm assembly 19, 21 respectively. Means are provided whereby each arm assembly 19, 21 will be urged toward the peripheral surface of capstan 13 for purposes described in the above identified patent application. Thus, at the upper end of each swing arm assembly 19, 21 a rack 22, pivotally mounted at 23 from an arm extension portion ***19a*, *21a* respectively serves to cooperate with a drive gear 24 powered by a torque motor 26. Torque motor 26 is mounted upon a stationary member 27 forming a portion, for example, of a bed or base plate (not shown) of the transport apparatus. Each rack 22 rests on a rotatable bearing 28 formed with retaining flanges so as to maintain the teeth of rack 22 and gear 24** in continuous engagement.

Each arm assembly 19, 21 is pivotally mounted at fixed pivot points 29, 31 respectively of the base plate or frame portion 32 whereby operation of torque motors 26 serves to rotate arm assemblies 19, 21 toward the peripheral surface of capstan 13.

From the foregoing description it will be readily apparent that as capstan 13 is driven in the direction of arrow 33 tape will be unwrapped from supply roll 11 and wrapped upon take-up roll 12. It will further be evident that rolls 11 and 12 will respectively advance and retreat toward and away from capstan 13 during the transfer of tape.

Means responsive to the advancing movement of supply roll 11 relative to capstan 13, now to be described, serve to maintain, at a substantially constant predetermined level, the work load as applied to capstan 13 during transfer of tape. This means is responsive to the advancing movement whereby an applied resistance to feeding of tape from the supply roll is gradually diminished during transfer of the tape. In this manner a diminishing restraint is applied to the tape movement during transfer.

Thus, brake means have been provided which include a rotating brake drum 34 forming a braking surface disposed to rotate with each of rolls 11, 12. A brake element in the form of a brake band of spring steel 36 wrapped, for example, one and one-half times about brake drum 34 cooperates with drum 34 to apply resistance to rotation of the supply roll. Brake band 36 is preferably formed with a prepared friction surface provided, for example, by means of a heavy felt lining 37 which rides on the surface of brake drum 34.

Each end of brake band 36 carries an anchor pin 38, 39 which are slidably carried in holes drilled through portions of arm assemblies 19, 21. Each anchor pin 38, 39 is formed with an enlarged head which bottoms against the surface of the corresponding fixed portion of arm assembly 19, 21 through which it is carried.

Resilient biasing means responsive to advancing movement of supply roll 11 toward capstan 13 serves to diminish the cooperative engagement between the lining 37 and the braking surface of drum 34 so as to diminish the braking resistance to rotation of roll 11 as roll 11 approaches capstan 13.

Thus, a braking spring 41 is adjustably anchored at its lower end by means of a hollow screw 42 through which a chain 43 passes. Chain 43 is engaged relative to the head of screw 42 by means of a slotted disc 44 which serves to anchor the lower end of chain 43. The other end of spring 41 is fixed to the end of pin 39.

The other end of brake band 36 is yieldingly coupled by means of a release spring 46 to an anchor point 47 fixed relative to the arm assembly 19, 21. Spring 46 serves to relieve the cooperative engagement between brake band 36 and the braking surface of drum 34 in response to reversal of movement of the tape as will be explained in detail further below.

As thus arranged, spring 41, which is of a greater force than spring 46, serves to tighten brake band 36 about drum 34 to a point defined by the bottoming of the enlarged head of pin 38 against the abutment 48 of arm assembly 19 or 21. As arm assembly, for example, 21 pivots leftward away from capstan 13, spring 41 will become extended whereby the cooperative engagement between the lining 37 of brake band 36 and the braking surface of brake drum 34 will be commensurately increased. Thus, at the start of feeding of tape from roll 11 the maximum braking action will be applied. In this manner capstan assembly 13 will need to apply a greater tape moving force than would otherwise be required.

As tape is fed from supply roll 11 to take-up roll 12 the mechanical advantage found in the greater "lever arm" of the greater radius becomes reduced and accordingly the capstan drive motor 17 would normally be expected to be called upon to exert a greater driving force than when the roll of tape was full. However, contemporaneously with the foregoing, those braking forces applied by means of brake drum 34 and brake band 36 are correspondingly diminished so as to diminish the resistance to feeding of the tape in response to the advancing movement of roll 11 toward capstan 13. Accordingly, it will be observed that as roll 11 moves toward capstan 13, spring 41 becomes more and more relaxed so that it exerts less force upon the end of brake band 36.

Means responsive to reversal of rotation of roll 11, as by reversing the direction of rotation of capstan 13 have been provided which serve to release in large part the engagement between lining 37 and brake drum 34. Thus, during reverse rotation of roll 11, that end of brake band 36 anchored by pin 38 has been connected in a yieldable fashion to the fixed point 47 of the arm assembly. Otherwise, during reverse rotation of roll 11, that end of brake band 36 anchored at point 47 will move pin 38 away from its stop due to clockwise rotation of drum 34, thus releasing the brake when the hub moves in a direction acting as for a take-up hub.

During rotation of roll 11 in supplying tape, the head on pin 38 serves to limit the elongation of spring 41. During reverse rotation of roll 11 the head on pin 39 serves to limit the extension of spring 46. In this manner, the range of operation of springs 41, 46 is well defined between fixed limits.

From the foregoing, it will be readily apparent that by applying an initial braking resistance to the feeding of tape which is gradually diminished during a transfer of tape from a supply roll to a take-up roll the capstan motor 17 will experience a constant work load throughout the transfer of a complete roll of tape.

Accordingly, it is part of the teaching of this invention to pursue the method, using a rotating drive capstan, of feeding a length of pliable recording tape from a supply roll pursuant to the steps of cooperatively engaging the tape and capstan to withdraw tape under a varying capstan work load in unwrapping the supply roll, and during the unwrapping of tape, pursuing the step of applying resistance to the withdrawal in a degree serving to compensate for the varying work load in a manner maintaining the capstan work load at a substantially constant level.

More particularly, the method comprises the steps of cooperatively engaging the tape and capstan to unwrap tape from the supply roll, applying resistance to the unwrapping of the supply roll during the unwrapping of tape therefrom, and during unwrapping of tape from the supply roll pursuing the step of diminishing the applied resistance in a varying degree, related to the degree of unwrapping of the tape wherein the varying degree of resistance serves to maintain the capstan under a substantially constant work load. It will be further apparent that the particularly preferred manner in which the application of resistance to the withdrawal is pursued more specifically comprises the steps of applying such resistance in a gradually diminishing degree in response to movement of the axis of rotation of the supply roll.

According to another embodiment of the invention as shown in FIGURE 3, a supply roll 51 including a hub 52 is mounted for rotation about a fixed axis of rotation 53. Similarly, take-up hub 54 serves to form a take-up roll 55 adapted to rotate about a stationary axis of rotation 56. A drive capstan 57 is driven by a suitable capstan drive motor (not shown) whereby magnetic recording transduced 58 can cooperate with tape carried on the peripheral surface of capstan 57.

Means have been provided to compensate for the changing roll diameters during feeding of tape and for applying a compressive force to the capstan and tape rolls which serves to develop appropriate tensioning in the tape for purposes as described in the above identified copending patent application. Thus, a pair of resilient compensating rollers 59, 61 are supported for rotation on a pair of swing arms 62, 63, pivoted about the axis of rotation 64 of capstan 57.

Means are provided in the form of torque motors 66, 67 mounted on a fixed portion of a frame or base plate 68 whereby an associated rack 69 and pinion 70, as described relative to the embodiment in FIGURE 1, serves to transmit the desired compressive forces.

In general, as tape is fed from supply roll 51 it passes around compensating roller 59 and onto capstan 57 where transducer 58 cooperates with the tape. Subsequently, the tape then passes around compensating roller 61 and onto take-up hub 54 to form take-up roll 55. During the feeding of tape each compensating roller 59, 61 moves into and out of the gap formed between a respective one of hubs 52, 54 and capstan 57.

Means for generating an applied resistance to feeding of tape which can be diminished as tape is fed from the supply roll comprises the brake bands 71 wrapped one and one-half turns about a brake drum 72 in the manner as previously described with regard to FIGURE 1. Thus, each end of brake bands 71 is secured to a pin whereby one end will be secured, as at 73, (via a spring 75) to an arm assembly 74, while the other end is secured via a spring 76 to an adjustable fixed anchoring point, as provided by screw 77.

As shown in FIGURE 3, springs 76 constitute the braking springs and are hence stronger than their relatively weaker release springs 75. Arm assemblies 74 are pivotally coupled by slot 78 and pin 79 to permit rollers 59, 61 to follow the changing diameter of the rolls 51, 55. Each spring 76 applies a braking force to its associated brake 71 via a strand 80 trained about a pulley 81 as carried by rollers 59, 61.

In operation, when feeding tape from supply roll 51 to take-up roll 55, a predetermined torque is applied from torque motor 66 so as to compress the accommodating roller 61 into a firm engagement between capstan 57 and the "rim" or tread edge of take-up roll 55. The force with which roller 61 acts is preferably greater than a similar compressive force developed by torque motor 67 in urging roller 59 similarly into engagement with supply roll 51.

From inspection of FIGURE 3, it is readily apparent that initially arms 62, 63 will be moved to a position serving to extend the left hand braking spring 76 a maximum amount and that as roller 59 moves between capstan 57 and roll 51, a maximum though diminishing braking force will be applied to resist the rotation of roll 51. However, as the diameter of supply roll 51 diminishes, the axis of the accommodating roller 59 will move clockwise serving to reduce the extension of its spring 76 thereby reducing the braking force generated by friction between the brake lining of the left hand brake band 71 and its brake drum.

The degree to which the left hand spring 76 is permitted to extend under rotation of roll 51 is limited by the bottoming of the enlarged head of the connecting pin 82.

During the supply of tape from roll 51, it will be observed that the braking arrangement for the accommodating roller 61 is released due to the resilience of its light-weight spring 75 which readily permits the associated brake band 71 to move generally out of engagement with the friction surface of the cooperating brake drum. The apparatus as shown in FIGURE 3 is, accordingly, bi-directional inasmuch as when feeding tape from hub 54 to hub 52 the light-weight spring **75*b* will similarly serve to release the braking engagement developed by swing arm 63**.

Referring to FIGURE 2, another embodiment according to the invention, is schematically shown of a type where a drive capstan 84 cooperates with a pinch roller 86 to feed tape from a supply roll 88 past a transducer 89 to take-up means (not shown).

Supply roll 88 is arranged whereby the edge of the roll rides against a limiting roller 93 mounted for rotation about a stationary axis. Suitable means, such as the spring 96, serves to rotate the supporting swing arm 98 whereby roll 88 will be yieldingly urged against roller 93.

In the embodiment shown in FIGURE 2, a braking arrangement has been provided similar to those of FIGURES 1 and 3 whereby as tape is fed from supply roll 88, the applied braking force is initially relatively high and gradually diminishes responsive to laterally advancing movement of the axis of rotation of the roll.

Accordingly, it will be apparent from inspection of FIGURE 2 that as tape is initially withdrawn from supply roll 88, the braking spring 101 associated with swing arm 98 will be extended to its maximum length. As tape is unwrapped from roll 88 and its diameter decreases, swing arm 98 will move to a position whereby braking spring 101 becomes less extended and accordingly applies less braking force to brake band 102.

As in the foregoing embodiments, a relatively lightweight release spring 103 is anchored to the swing arm 98, as at joint 104 to permit bi-directional feeding of tape.

In the foregoing embodiments, the roll of tape has been supported upon a swing arm construction. As shown in FIGURE 4, however, a parallel bar embodiment is disclosed of somewhat similar construction to that described above.

Accordingly, a pair of parallel bars 111, 112 are mounted upon a tape deck or base plate (not shown) and serve, by means of the movable carriage bar 113, to carry a supply roll 114 of tape. It is to be understood that the right hand portion of the construction is essentially a duplication of the left hand portion as described herein, and thus the take-up roll 116 is represented merely by phantom lines.

In addition to supply roll 114 and take-up roll 116, a capstan 117 is disposed upon a fixed member 118 and serves to drive the rolls of tape past a transducer 119. Thus capstan 117 is provided with a motor 121.

Means for urging the rolls 114, 116 into engagement with capstan 117 includes a torque motor 122 coupled by means of a rack 123 and pinion 124 to drive carriage 113 toward capstan 117. Similarly, on the take-up side of the apparatus, another torque motor (not shown) has been provided.

A brake band 126 cooperates with an associated brake drum carried about the axis of rotation of roll 114.

A relatively strong spring 127 extends between an anchoring point 128 which, if desired, can be adjustable as heretofore described. The other end of spring 127 is connected to a pin 129 slidably mounted in a bridge portion 131 of the bar 113. During rotation of roll 114 in a direction of the arrows applied thereto in the drawing, the head of pin 129 will be carried to the left away from bridge portion 131 by the frictional engagement between brake band 126 and its associated drum. As can be seen from inspection, where roll 114 is relatively large, spring 127 will be relatively greatly extended thereby applying a greater braking force via brake band 126.

Means for releasing the braking engagement between brake band 126 and its associated brake drum during reverse rotation of roll 114 includes the yieldable relatively lightweight spring connection 132 anchored at 133. During rotation of roll 114 in the direction of the arrows as shown in the drawing, the head of pin 134 will bottom against bridge portion 131. However, during reverse rotation of roll 114, pin 134 will be moved to the left as shown in FIGURE 4 restrained only by the relatively light-weight spring 132.

What is claimed is:

1. In a tape transport apparatus of a type for feeding a length of pliable recording tape wrapped to form supply and take-up rolls, apparatus comprising means for supporting each of the rolls for rotation, annular rotating means disposed to engage the supply roll in feeding tape to the take-up roll, drive means for rotating said annular means at a predetermined speed of rotation, means for maintaining said supply roll in substantially continuous contact with said annular means as the diameter of the roll varies during feeding of tape to permit the supply roll to relatively advance toward the annular means in response to diminishing supply roll diameter, and means varying in response to such advancing movement in a manner to maintain, at a substantially constant predetermined level, the work load as applied to said annular means during transfer of tape from said supply roll to the take-up roll.

2. In tape transport apparatus of a type for feeding a length of pliable recording tape wrapped to form supply and take-up rolls, and having a drive capstan arranged to withdraw tape from the supply roll, wherein progressive feeding of tape from the supply roll to the take-up roll serves to vary the work load applied to said capstan in withdrawing tape from the supply roll, apparatus for maintaining the work load at a substantially constant level during transfer of tape from the supply to the take-up roll, said apparatus comprising means for rotatably supporting said supply and take-up rolls, the last named means serving to support said supply roll for movement laterally in a predetermined direction during unwrapping of tape therefrom, and means responsive to said movement of said supply roll in said direction for applying a progressively diminishing restraint upon tape supply roll rotation during feeding of tape.

3. In tape transport apparatus of a type for feeding a length of pliable recording tape wrapped to form supply and take-up rolls, and having a drive capstan arranged to withdraw tape from the supply roll, wherein progressive feeding of tape from the supply roll to the take-up roll serves to vary the work load applied to said capstan in withdrawing tape from the supply roll, apparatus for maintaining the work load at a substantially constant level during transfer of tape from the supply to the take-up roll, said apparatus comprising means for rotatably supporting said supply and take-up rolls, said supply and take-up rolls being disposed respectively to advance and retreat with respect to said capstan during feeding of said tape, and brake means associated with said supply roll serving to apply a progressively diminishing applied resistance to the rotation of the supply roll responsive to advancing movement of said supply roll relatively toward the capstan.

4. In tape transport apparatus of a type for feeding a length of pliable recording tape wrapped to form supply and take-up rolls, and having a drive capstan arranged to withdraw tape from the supply roll, wherein progressive feeding of tape from the supply roll to the take-up roll serves to vary the work load applied to said capstan in withdrawing tape from the supply roll, apparatus for maintaining the work load at a substantially constant level during transfer of tape from the supply to the take-up roll, said apparatus comprising means for rotatably supporting said supply and take-up rolls, said supply and take-up rolls being disposed respectively to advance and retreat with respect to said capstan during feeding of said tape, and brake means associated with said rolls serving to supply a progressively diminishing resistance to the rotation of supply roll responsive to advancing movement of said supply roll relative to the capstan, said brake means comprising means forming a braking surface disposed to rotate with each of said rolls, means forming a brake element cooperating with each of said braking surfaces to apply resistance to rotation of the supply roll, resilient biasing means responsive to advancing movement of said supply roll toward said capstan to diminish the cooperative engagement between said brake element and its cooperative braking surface to diminish said resistance, means serving to confine said resilient movement to a predetermined range, and yieldable means serving to relieve said cooperative engagement between said brake element and said associated surface in response to reversal of the movement of said tape.

References Cited

UNITED STATES PATENTS

| | | | |
|---|---|---|---|
| 2,097,592 | 11/1937 | Gibbs | 242—67.4 X |
| 2,605,056 | 7/1952 | De Kanski et al. | 242—54.1 |
| 2,733,069 | 1/1956 | Frost et al. | 242—55.14 |
| 3,380,680 | 4/1968 | Dunsheath et al. | 242—75.43 |

GEORGE F. MAUTZ, Primary Examiner

U.S. Cl. X.R.

242—55.14, 75.4